United States Patent [19]

Dobranis

[11] 4,105,963

[45] Aug. 8, 1978

[54] BRUSHLESS WELDING GENERATOR

[75] Inventor: Aurel Dobranis, Leverkusen, Germany

[73] Assignee: J. U. W. Muller, Maschinen-und Armaturenfabrik GmbH, Leverkusen, Germany

[21] Appl. No.: 803,117

[22] Filed: Jun. 2, 1977

[30] Foreign Application Priority Data

Jun. 3, 1976 [DE] Fed. Rep. of Germany ....... 2624904.
May 17, 1977 [DE] Fed. Rep. of Germany ....... 2722199

[51] Int. Cl.² .............................................. H02P 9/30
[52] U.S. Cl. ..................................... 322/48; 219/133; 310/178; 322/25; 322/63
[58] Field of Search ....................... 322/28, 59, 63–66, 322/48, 25, 27; 310/178, 184, 188; 219/133

[56] References Cited

U.S. PATENT DOCUMENTS

| 2,134,510 | 10/1938 | Hague et al. | 322/66 X |
| 2,261,684 | 11/1941 | Jones | 322/48 X |
| 3,229,133 | 1/1966 | Sears | 310/178 |
| 3,649,903 | 3/1972 | Fiedler | 322/63 X |
| 3,863,137 | 1/1975 | Mishima et al. | 322/28 X |

Primary Examiner—Robert J. Hickey
Attorney, Agent, or Firm—Haseltine, Lake & Waters

[57] ABSTRACT

A brushless welding generator with a homopolar machine which supplies welding current, and has winding-free rotors with several pole rings. Each of these form an air gap of varying size around its periphery with the stator. The homopolar machine is divided into two electromagnetic parts, each having an exciting winding. The exciting field is controlled in one of the two electromagnetic parts in opposition to the welding current. One electromagnetic part, furthermore, has a further exciting winding fed by the welding current to control its exciting field. This further exciting winding produces an exciting field directed opposite to the exciting field of the first-mentioned exciting winding. A regulator controls the welding current of one exciting winding, and a signal derived from the welding current is applied to the regulator for representing an actual value. A triac is arranged in a feed circuit of the exciting current to be rectified, and this triac is connected in circuit by the regulator through a time-delay network.

12 Claims, 5 Drawing Figures

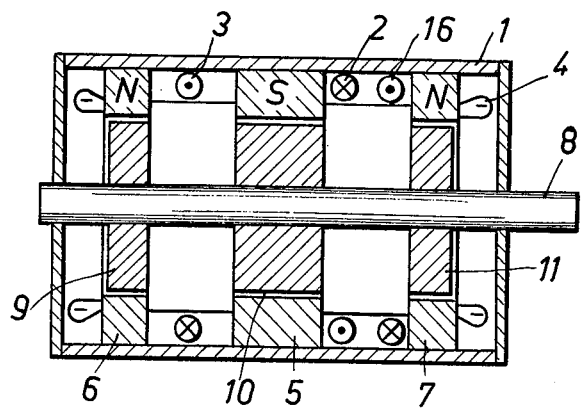
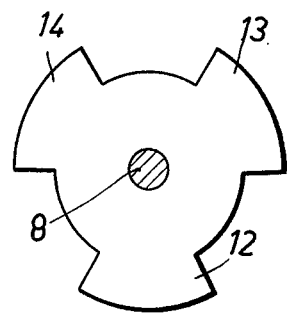
Fig. 1   Fig. 2
Fig. 3
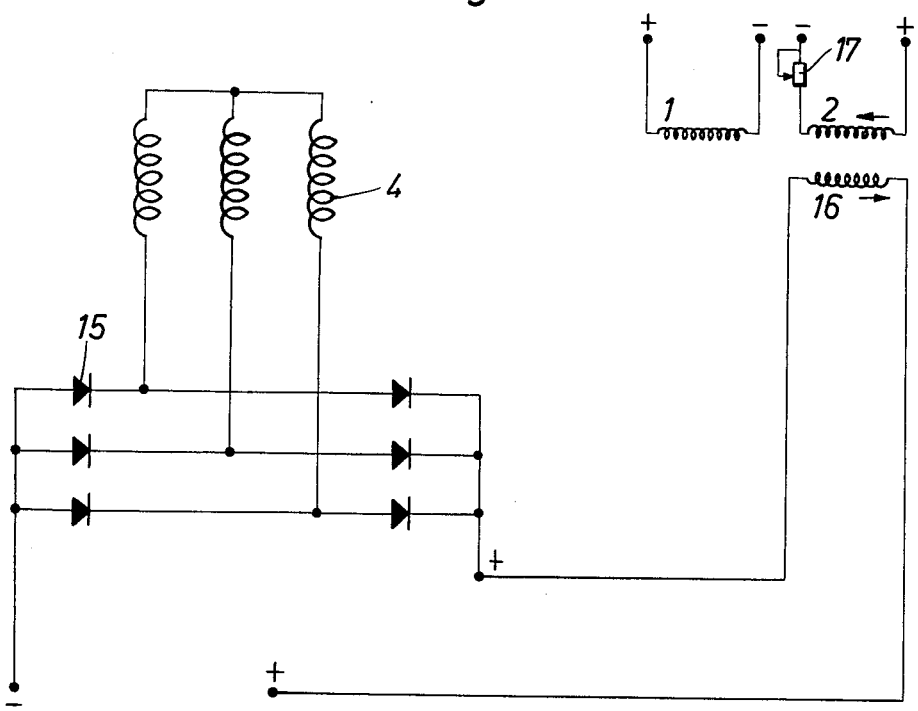

BRUSHLESS WELDING GENERATOR

BACKGROUND OF THE INVENTION

The present invention relates to a brushless welding generator with a homopolar machine which supplies the welding current having a particular winding-free rotor with several pole rings each forming an air gap of varying size around its periphery with the stator.

Brushless welding generators of the homopolar type have been known for a long time. In a known welding generator of this type (German Pat. No. 686,274) the exciting winding is arranged in the stator between two axially adjacent annular poles. Each of the two annular poles has a pole ring. The pole rings are arranged on the winding-free rotor and can be twisted against one another and against a spring which couples them together. The aim of this arrangement is to maintain the generator voltage, on no-load operation, automatically at a desired safe low voltage and, on ignition or burning the arc, at the necessary high voltage. Regulating or control means are not provided for producing a falling current-voltage characteristic for the welding current.

Although welding generators of the homopolar type have been known for a long time, they have not been used widely in practice. However, brushless welding generators which, for example, comprise an exciting machine and a synchronous generator, are in use. The alternating current produced by the exciting machine is rectified so that it can be used to excite the synchronous generator. In order to avoid contact with brushes, it is usual to arrange both machines on the same shaft so that rectifiers, which rotate with the rotor of the machine, can be used to rectify the exciting current for the synchronous generator. Experience has shown, however, that such welding generators are susceptible to trouble due to the rotating rectifiers.

Accordingly, an object of the invention is to produce a brushless welding generator which is simpler in construction and less susceptible to trouble than known brushless welding generators comprising an exciting machine and synchronous generator, and which supplies a falling current-voltage characteristic for the welding current.

SUMMARY OF THE INVENTION

This object is solved, according to the invention, by a welding generator of the aforementioned type in that the homopolar machine is divided into two electromagnetic parts each having an exciting winding. The exciting field is controlled in one of the two electromagnetic parts in opposition to the welding current.

No rotating rectifiers are necessary on the welding generator according to the invention, and therefore the generator is less expensive and less susceptible to trouble. The falling current-voltage characteristic is achieved in a simple manner by an inverse feedback of the welding current, so that welding may always take place at the optimum point of operation. The division into two electromagnetic parts also acts favorably for the welding process with respect to the time constant which is very low in relation to the time constant of welding generators with two completely separated electric machines.

The division into two electromagnetic parts enables the welding generator to be controlled very simply, i.e. in that one electromagnetic part has a further exciting winding fed by the welding current. This exciting winding produces an exciting field which is directed opposite to the exciting field of the first exciting winding.

According to another embodiment, the control of the welding current can be improved if a regulator is allotted to one of the exciting windings, a signal derived from the welding current being supplied to the regulator as actual value. A triac, which is placed in circuit by the regulator by means of a time-delay member, is preferably arranged in the feed circuit for the exciting current to be rectified. The time-delay member can consist of a transistor, a rectifier bridge and a capacitor. The charging time of the capacitor can be influenced automatically in this way by the regulator.

A potentiometer can be provided in both embodiments to adjust the ratio of welding current and exciting current. The potentiometer in the second embodiment is for expedience arranged at the entrance of the regulator.

The two electromagnetic parts of the homopolar machine for expedience have a common stator and a common rotor with a divided middle pole or preferably a common middle pole, in which the magnetic flux of the two electromagnetic parts has the same direction. The magnetic circuit of one of said electromagnetic parts is closed by the pole rings of the rotor, the rotor shaft, the poles of the stator and the stator housing. In the case of a divided middle pole, a further alternating current winding can be arranged in the stator of the electromagnetic part which is free from the further exciting winding. This further alternating current winding then supplies a voltage which is very independent of the current and which can be used for other purposes than for welding. The further alternating current winding is preferably three-phase.

According to a further embodiment of the invention the exciting windings are arranged so as to be idle between the salient pole rings.

BRIEF DESCRIPTION OF THE DRAWINGS

The invention is explained in more detail below by means of a drawing showing an embodiment:

FIG. 1 shows a scematic representation of a welding generator in axial section;

FIG. 2 shows a top view of the rotor of the welding generator according to FIG. 1;

FIG. 3 shows the circuit diagram of the welding generator according to FIG. 1 with a further exciting winding;

DESCRIPTION OF THE PREFERRED EMBODIMENTS

Figure 4:
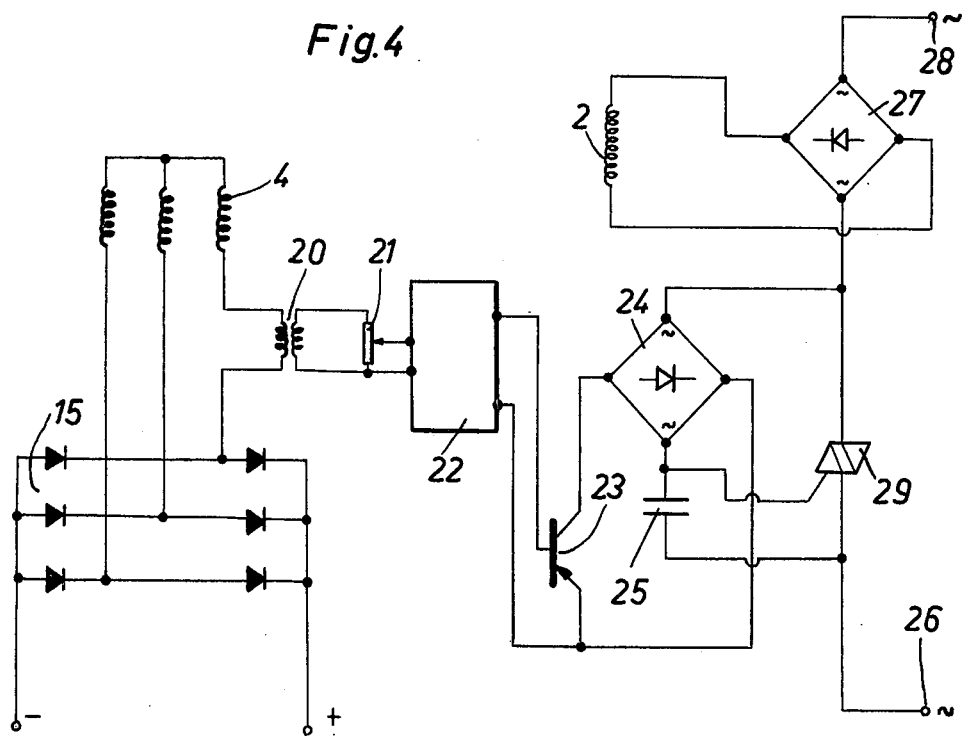
FIG. 4 shows a modified circuit diagram of the generator with a regulator.
Figure 5:
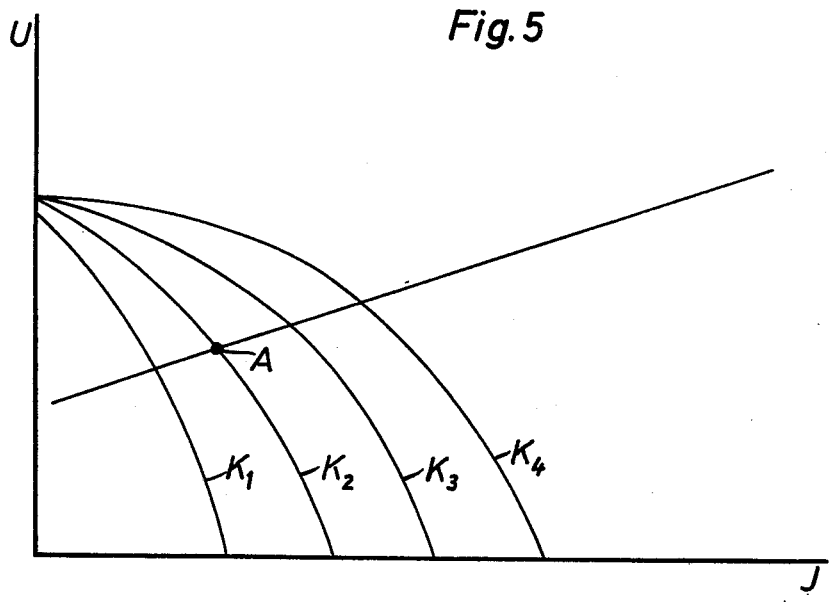
FIG. 5 shows a current-voltage characteristic field for a welding generator.

Two winding parts 2, 3 of an exciting winding are arranged adjacent one another in a stator housing 1 of the welding generator. A common annular pole 5 is positioned between these two parts and a further annular pole 6, 7 is positioned on the outside of each of the winding parts 2, 3. Continuous conductors 4 of a three-phase winding are arranged in grooves of the annular poles 5, 6, 7 over the entire length of the machine.

A disc-shaped pole 9, 10, 11 which is non-rotatably fixed on a shaft 8, is arranged within each annular pole 5, 6, 7. Each pole 9, 10, 11 has symmetrically distributed recesses to form three wings 12, 13, 14.

Parts 2, 5, 7, 10, 11 represent one electromagnetic part of the homopolar machine and parts 3, 5, 6, 9, 10 represent the other elctromagnetic part. As indicated in FIG. 2 and as can be seen from FIG. 3, the two winding parts 2, 3 of the exciting winding are passed through by the exciting current in opposite direction so that they produce opposed axial magnetic fields in which the annular pole 5 arranged between them forms the southpole and the two outer annular poles 6, 7 form the north-pole. The two magnetic circuits are therefore closed by the annular pole 5, the stator housing 1, the annular poles 6, 7, the poles 9, 11, the rotor shaft 8 and the middle pole 10. In view of this arrangement of the two electromagnetic parts and their excitation, the magnetic flux has the same orientation in the common annular pole 5 and common middle pole 10. The magnetic flux over the air gaps between the poles 5, 10 and 6, 9 and 7, 11 hereby concentrates itself on the range of the wings 12, 13, 14. For this reason, a fluctuating field is produced at the periphery of the poles 5, 6, 7 when the rotor 8, 9, 10, 11 rotates and this fluctuating field induces alternating current into the conductors 4. The conductors 4 form the afore-mentioned three-phase alternating current winding as shown in FIG. 3. The current supplied thereby is rectified by means of full-wave rectifier 15 and is at hand as welding current.

A further exciting winding 16 is arranged adjacent the exciting winding 2 to improve the welding properties of the welding generator. The arrangement is made here in such a manner that this further exciting winding 16 produces an axial magnetic field which is opposed to the magnetic field of the exciting winding 2. An inverse feedback is therefore effected by the exciting winding 16.

A rheostat 17 can be arranged in the lead of the exciting part winding 2 to control the welding current. A specific characteristic curve can be adjusted with the rheostat 17. The additional exciting winding 16 is in series with the rectifier set 15 of the induced three-phase winding 4 supplying the welding current, as shown in FIG. 3. The effect of his is that the magnetic field of the exciting part winding is weakened with increasing welding current, which causes reduction in the welding current. Therefore, as a result stabilization of the point of operation is achieved in the current-voltage characteristic.

The welding properties of the welding generator (falling current-voltage characteristic for the welding current) can be still further improved by providing a regulator. The welding generator is represented in FIG. 4 with such a regulator. In this case the additional winding 16 is not present. The current in the exciting part winding 2 is controlled in place of this. A current transformer 20, which supplies a signal proportional to the welding current to a regulator 22 to represent the actual value by means of a potentiometer, is provided as current sensor in a phase of the alternating current winding 4 to detect the welding current. The regulator 22 controls a high-power transistor 23, in the collector-emitter circuit of which a rectifier circuit is arranged in the form of a diode bridge 24. One alternating current input of this diode bridge 24 is connected to a pole 26 of an alternating current source by means of a capacitor 25, whereas the other alternating current input of the diode bridge 24 is connected to the other pole 28 of the alternating current souce by means of a further rectifier circuit in the form of a diode bridge 27. The latter supplies the excitng part winding 2 with direct current.

The transistor 23, the bridge 24 and the capacitor function as a time-delay element. A controllable semi-conductor element in the form of a triac 29 is arranged in series with the diode bridge 27 and parallel to the diode bridge 24 and the capacitor 25, to control the exciting current in the exciting winding part 2. The control input of the triac 29 is connected with the alternating current input of the diode bridge 24 to which the capacitor 25 is connected.

The circuit according to the invention controls the welding current in the following way:

In order to work with optimum voltage for optimum welding results, it is necessary for the welder first to adjust the setting of the potentiometer 21 with respect to the characteristics of the material to be welded and the electrode to be used. Such a characteristic field is represented in FIG. 4 with the standard operational voltage. The characteristic field is determined by the properties of the welding generator. If the point of operation A is optimum for the material to be welded and the chosen electrode, then the characteristic K2 will be adjusted at potentiometer 21. The circuit according to the invention now ensures that this point A is maintained during the welding process. If the welding current falls, then the actual value at the entrance of the regulator 22 is below the set value. The regulator 22 renders the high-power transistor 23 more conductive so that more current can flow through the diode bridge 24. This means that the capacitor 25 is loaded earlier and the triac 29 is conducting earlier. Consequently, more exciting current can flow to the exciting winding 2. The increased excitation effects an increase in the induced current and therewith in the welding current.

I claim:

1. Brushless welding generator with a homopolar machine supplying welding current, comprising: winding-free rotors with several pole rings each forming an air gap of varying size around its periphery with the stator, said homopolar machine being divided into two electromagnetic parts each having an exciting winding for forming an exciting field controlled in one of said two electromagnetic parts in opposition to the welding current.

2. Welding generator according to claim 1, wherein one electromagnetic part has a further exciting winding fed by the welding current to control its exciting field, said further exciting winding producing an exciting field directed opposite to the exciting field of the first-mentioned exciting winding.

3. Welding generator according to claim 1, including a regulator for controlling the welding current of one exciting winding, a signal derived from the welding current being applied to said regulator and representing an actual value.

4. Welding generator according to claim 3, including a triac arranged in a feed circuit of the exciting winding for rectifying current therethrough, time delay means connected between said regulator and said triac, said triac being connected in circuit by said regulator by means of said time-delay means.

5. Welding generator according to claim 4, wherein said time-delay means comprises a transistor, a rectifier bridge connected to said transistor, and a capacitor connected to said rectifier bridge.

6. Welding generator according to claim 1, including a potentiometer for adjusting the ratio of welding current and current through said exciting winding.

7. Welding generator according to claim 6, wherein said potentiometer is connected to the input of said regulator.

8. Welding generator according to claim 1, wherein said two electromagnetic parts of said homopolar machine have a common stator and rotor with a divided middle pole in which the magnetic flux of said two electromagnetic parts has the same direction.

9. Welding generator according to claim 1, wherein one of said electromagnetic parts has a magnetic circuit closed by the pole rings of the rotor, a rotor shaft, poles of the stator and a stator housing.

10. Welding generator according to claim 8, including an alternating current winding arranged in a stator of one electromagnetic part, said one electromagnetic part being free from the other exciting winding.

11. Welding generator according to claim 10, wherein said alternating current winding is a three-phase winding.

12. Welding generator according to claim 1, wherein said two electromagnetic parts of said homopolar machine have a common stator and rotor with a common middle pole in which the magnetic flux of said two electromagnetic parts has the same direction.

* * * * *